Figure 10:
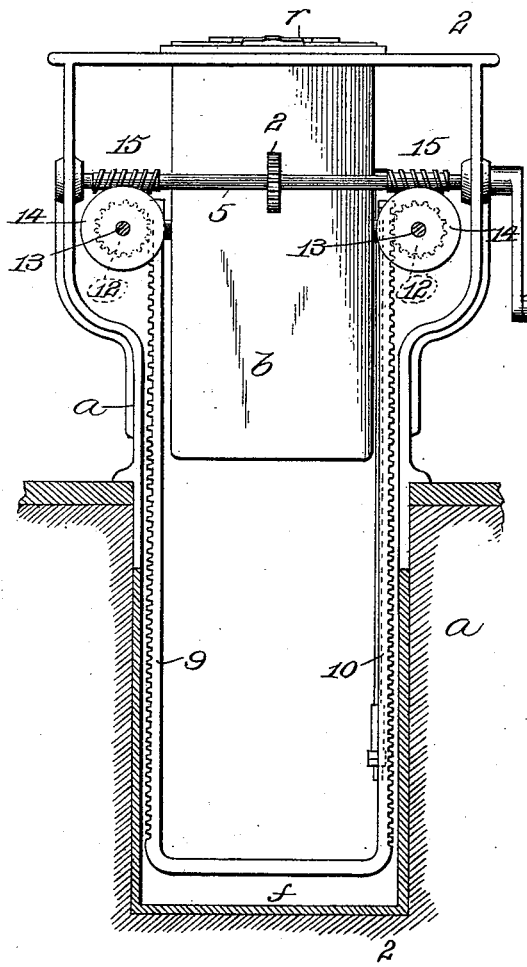

(No Model.) 5 Sheets—Sheet 1.
P. EVERITT, Dec'd.
H. M. WOOLF, Ancillary Executor.
BOX FOR ASHES.
No. 541,449. Patented June 18, 1895.
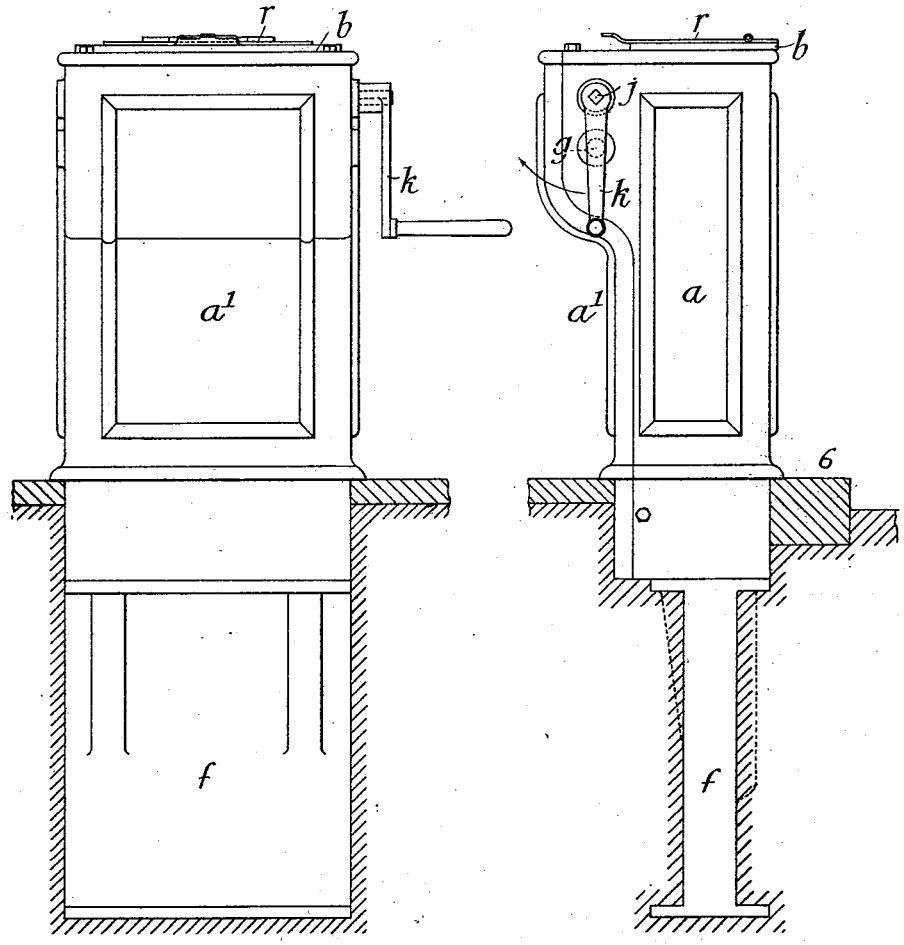
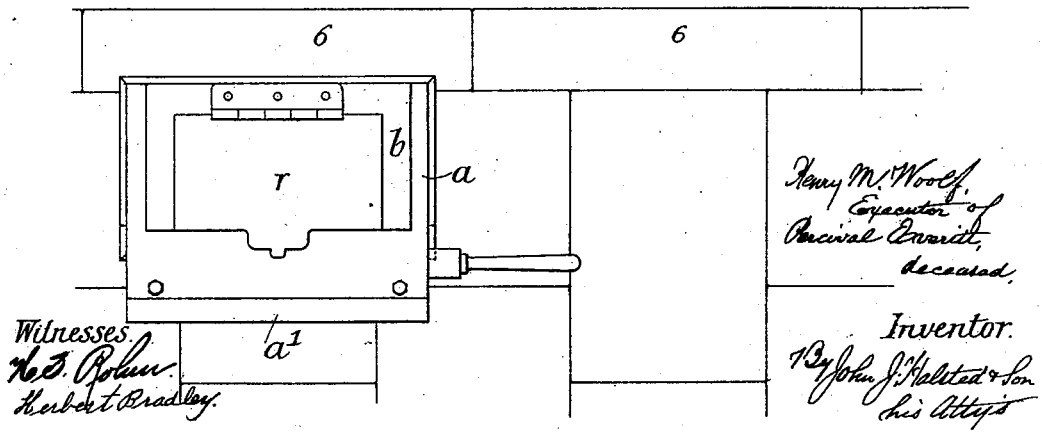
Witnesses:
Inventor.

(No Model.) 5 Sheets—Sheet 2.
P. EVERITT, Dec'd.
H. M. WOOLF, Ancillary Executor.
BOX FOR ASHES.
No. 541,449. Patented June 18, 1895.
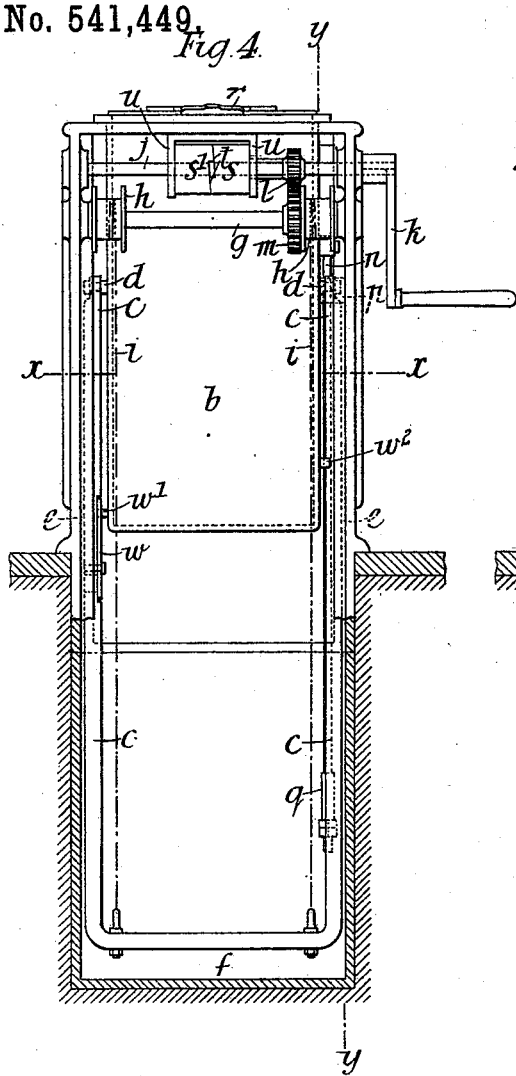
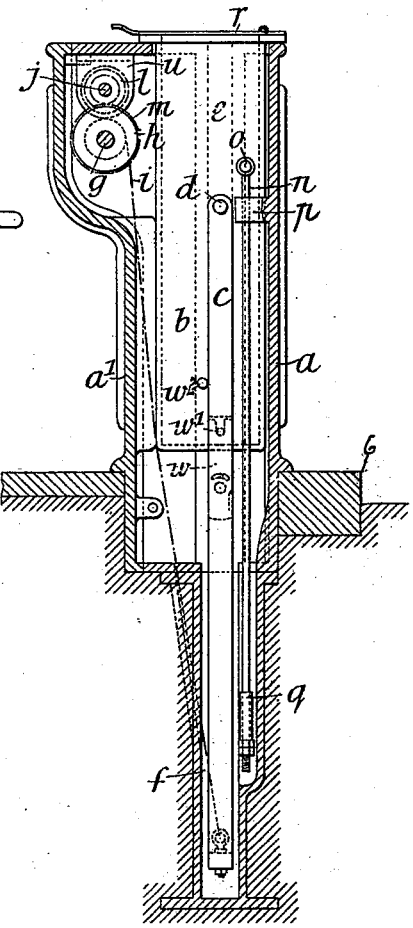
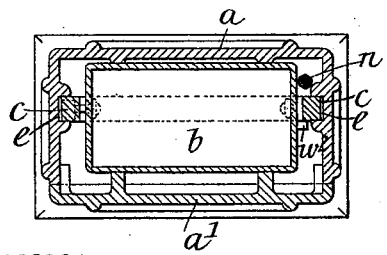
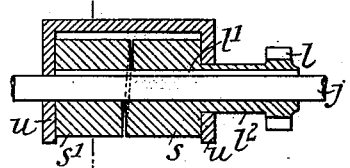
Witnesses.
Harry T. Rohrer.
Herbert Bradley.
Harry M. Woolf,
Executor of
Peircival Everitt
deceased,
Inventor.
By John J. Halsted & Son
Att'ys

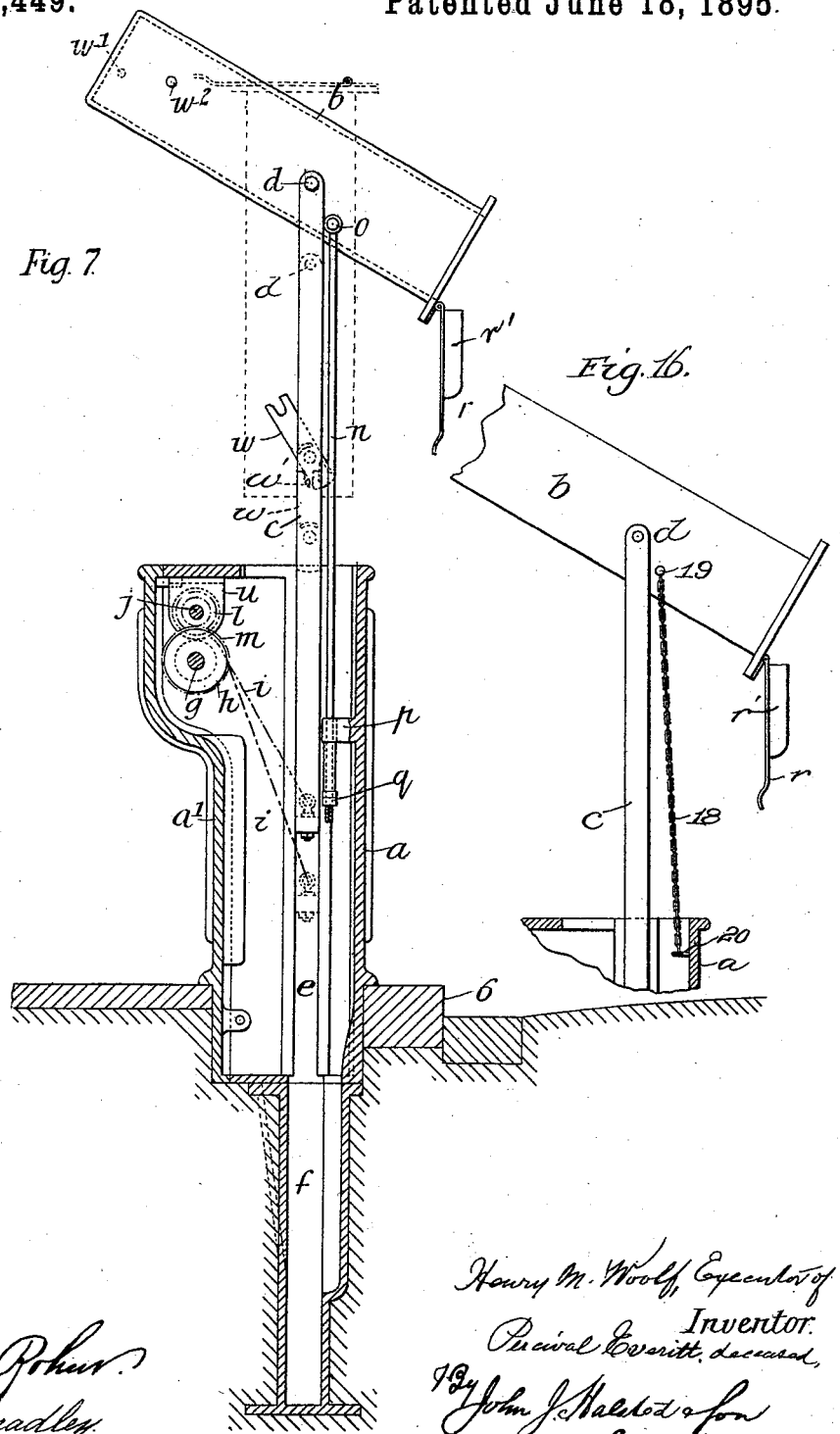

(No Model.)  5 Sheets—Sheet 4.

P. EVERITT, Dec'd.
H. M. WOOLF, Ancillary Executor.
BOX FOR ASHES.

No. 541,449.  Patented June 18, 1895.

Witnesses:
Harry D. Rohrer
Herbert Bradley

Harry M. Woolf,
Executor of
Inventor:
Percival Everitt
deceased
By John J. Halsted & Son
Attys (No Model.) 5 Sheets—Sheet 5.
P. EVERITT, Dec'd.
H. M. WOOLF, Ancillary Executor.
BOX FOR ASHES.
No. 541,449. Patented June 18, 1895.
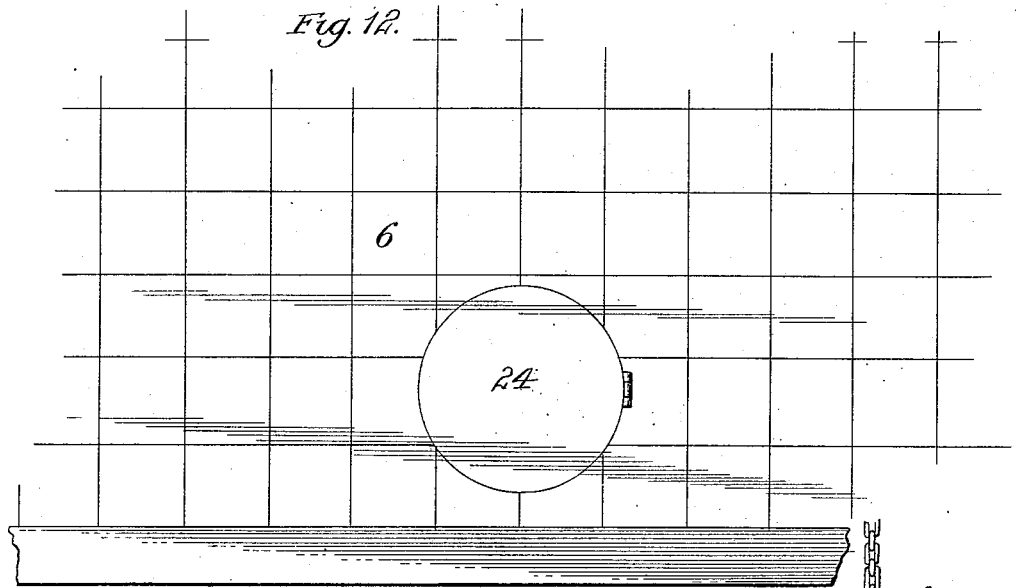
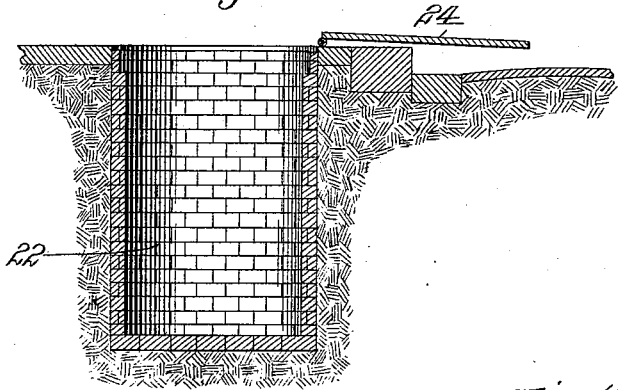
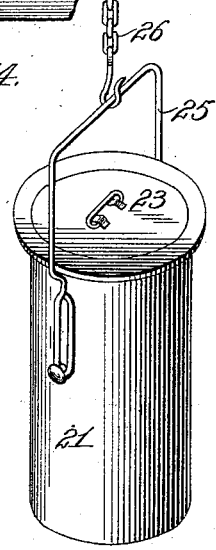
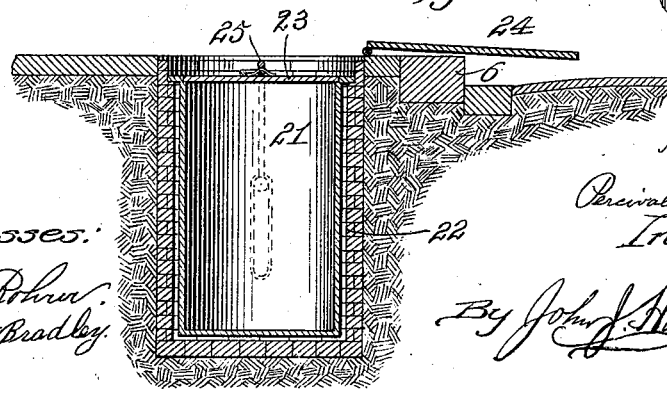
Witnesses:
H. S. Rohrer
Herbert Bradley
Henry M. Woolf,
Executor of
Percival Everitt, deceased,
Inventor:
By John J. Halstead Jr.
his Attys.

UNITED STATES PATENT OFFICE.

HENRY M. WOOLF, OF NEW YORK, N. Y., ANCILLARY EXECUTOR OF PERCIVAL EVERITT, DECEASED.

BOX FOR ASHES.

SPECIFICATION forming part of Letters Patent No. 541,449, dated June 18, 1895.

Application filed November 1, 1894. Serial No. 527,670. (No model.) Patented in England February 3, 1891, No. 1,972.

*To all whom it may concern:*

Be it known that I, HENRY M. WOOLF, a subject of the Queen of Great Britain, residing in the city and county of New York and State of New York, ancillary executor of the estate of PERCIVAL EVERITT, deceased, late a resident of London, England, and a subject of the Queen of Great Britain, declare that the said PERCIVAL EVERITT was the inventor of certain new and useful Improvements in or Connected with Boxes or Receptacles for Ashes, Garbage, and other Refuse, (patented in part in Great Britain by Letters Patent No. 1,972, dated February 3, 1891;) and I do hereby declare that the following is a full, clear, and exact description of the invention, which will enable others skilled in the art to which it appertains to make and use the same, reference being had to the accompanying drawings, and to letters and numerals of reference marked thereon, which form part of this specification.

The objects of this invention are to simplify and lessen the labor of removing garbage from the streets, it being first deposited in a public receptacle provided by me for that purpose, and presently to be described, and from which it can then be quickly dumped into a suitable van or cart, provided by the city authorities, and with little inconvenience to the general public.

The invention will be readily understood from the following; and it consists in a special construction of apparatus adapted for receiving, containing, raising and delivering garbage. The garbage receptacle may either be placed in a brick pit or casing beneath the surface or level of the sidewalk, or it and its casing may project above such surface as may be preferred; or it may be placed at the corner of a street or in any other suitable locality or position.

To fully explain this invention I will describe the same by reference to the accompanying drawings, in which—

Figure 11:
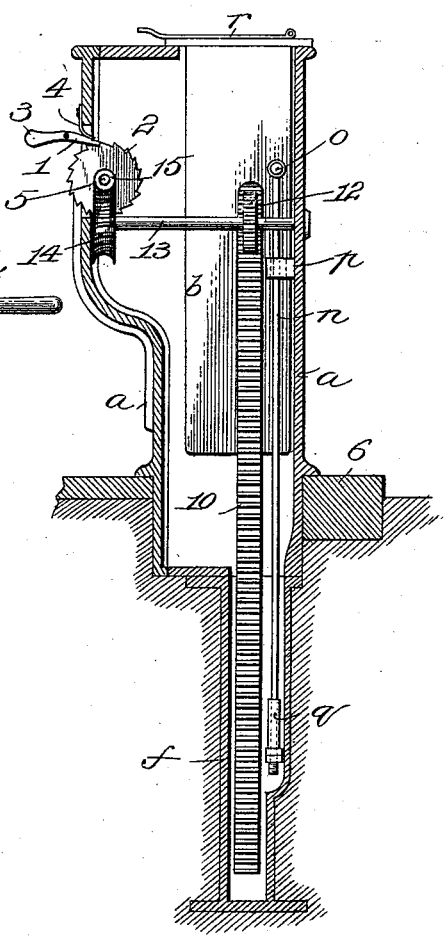

Figure 1 is a side elevation of a casing for the garbage receptacle or bin and showing, also, the top or cover of such receptacle. Fig. 2 is a rear view of the same, and Fig. 3 is a plan. Fig. 4 is a view similar to Fig. 2, but with the rear wall of the casing removed to show the internal mechanism. Fig. 5 is a section on the line $x$ $x$ of Fig. 4. Fig. 6 is a section on the line $y$ $y$, Fig. 4. Fig. 7 is a view similar to Fig. 6, but showing the box or receptacle in the position for discharging its contents, and also showing in dotted lines the same receptacle when raised to its full height before being tilted; Figs. 8 and 9, details, enlarged. Fig. 10 is a similar view to Fig. 4, but showing another means of raising and lowering the garbage-receptacle. Fig. 11 is a vertical section on the line $z$ $z$ of Fig. 10. Fig. 12 is a plan of a sidewalk showing the cover of a sunken vault for receiving the garbage-receptacle. Fig. 13 is a vertical section through said vault with its cover open. Fig. 14 is a perspective view of the garbage-receptacle ready for being deposited in the vault, with part of its lifting-chain attached. Fig. 15 is a vertical section of the vault and inclosed garbage-receptacle and with the cover of the former open. Fig. 16 shows a modified form of device for tilting the receptacle.

$a$ indicates the casing of the apparatus, one side $a'$ of which, as shown in the drawings, is made removable in order to afford access to the interior of the apparatus.

$b$ is the bin, box or receptacle, which is normally within the casing $a$, as shown in Figs. 4 and 6, or within any portion of the same, and which is carried by the skeleton, supporting and guide-frame $c$ upon trunnions $d$ $d$, the said frame being adapted to slide in grooves $e$ $e$ in the side walls of the casing.

$f$ is a well which receives the lower part of the frame when the apparatus is in the normal position, the said well when secured to the bottom of the casing, also serving as a foot for steadying the casing.

$g$ is a shaft supported in suitable bearings in the side walls and carrying two drums $h$ $h$, to which two cords or chains $i$ $i$ attached at one end to the bottom of the frame $c$ are connected in such manner that when the said shaft is rotated, the said chains will be wound upon the drums in order to cause the elevation of the frame $c$ and also of the box carried thereby.

Motion is imparted to the shaft $g$ from the shaft $j$ having the crank-handle $k$ through the medium of the gear wheels $l$, $m$. The pinion $l$ is connected to the shaft $j$ by a key $l'$, as shown in Fig. 8, but the slot in the gear-wheel $l$ is made broader than the key, as shown at $j^2$ in Fig. 9, to allow of a slight rotary movement of the side gear-wheel relatively to the shaft $j$ for a purpose hereinafter described.

$n$ is a rod secured to the box $b$ at a point $o$ above but to one side of the trunnions $d$, as shown in Fig. 6. The lower part of the said rod slides through a bracket $p$ and has upon it an adjustable stop $q$ which, after the box has been raised to a certain height, arrests any movement of the said rod $n$ so that any further upward movement of the said frame $c$ carrying the box causes the overturning of the latter, as shown in Fig. 7. With this construction it will be understood that by rotating the crank $k$, the box $b$ will first be raised vertically until its bottom is above the top of the casing $a$ and that then, as the upward movement of the frame carrying the said box continues, the latter will be tipped to discharge its contents.

$r$ is the lid of the receptacle which may serve (when a wagon is placed near to the box so that when the latter is overturned the said cover adapted to rest upon the edge of the cart or wagon or to be supported in any convenient way when dumping it is preferably made with side pieces or guides $r'$) to form a chute to prevent any of the contents of the box from falling into the road-way. When the cover is on the side pieces $r'$ lie inside the receptacle.

In order to prevent the sudden lowering of the box in case the handle is released, there is provided a pawl 1 (as shown in the modification, Fig. 11), for a ratchet 2 on the shaft 5, and having a handle 3, and a spring 4, which pawl can engage with the teeth of this ratchet; or a friction brake of such power as to retain the said box in an elevated position unless the handle is turned, may if preferred, be used instead of such pawl and ratchet. As shown in Figs. 8 and 9, this brake consists of two cylindrical blocks $s\ s'$ which are caused to rotate with the shaft $j$ by means of the key $l'$, but are capable of a slight rotary motion independent of the shaft in the same manner as the pinion $l$.

The block $s$ is connected with the pinion $l$ by a sleeve $l^2$, and the said two blocks have their adjacent faces inclined spirally as at $t$ and are arranged between two arms $u, u$ through which the shaft $j$ and the boss of the gear-wheel $l$ pass, the said arms being part of a bracket attached to the upper part of the casing $a$. With this arrangement, when the crank-handle $k$ is turned to elevate the box, the key or feather $l'$ in the shaft $j$ causes both blocks to rotate with the said shaft. When, however, the pinion $l$ rotates in the reverse direction, it moves the block $s$ while, owing to the amount of motion allowed by the broad key ways in the blocks, the block $s'$ remains stationary for a time whereby the spiral face of the block $s$ acts upon the corresponding face of the block $s'$ and so tends to separate the said blocks, thereby forcing them firmly against the faces of the arms $u\ u$ and producing the required friction to sustain the box. The lowering is effected by turning the handle in the reverse direction.

To insure that the box shall coincide with the opening in the top of the casing as it descends there may be provided a forked-piece $w$ pivoted to one of the standards $c$, with which piece a pin $w'$ on the side of the box is adapted to engage, so that as the box is lowered the said forked-piece owing to its angular position, will impinge against the edge of the casing and be moved to draw the box into the vertical position. (See Figs. 6 and 7.)

$w^2$ is a pin which strikes against one of the standards $c$ to prevent the box moving beyond the vertical position, and to prevent its tilting in the wrong direction.

Although in the foregoing description I have referred to the box or receptacle as being pivoted, it is to be understood that it may be fixed, in which case the whole or a part of one of the sides or of the bottom may be hinged to form a discharge door.

When it is necessary to empty the garbage from the box a cart or van is backed up, for instance, to the curb-stone indicated at 6, Figs. 1, 3, 6 and 7, or drawn up alongside. Then the crank is turned, which raises the garbage box into the elevated erect position shown in dotted lines in Fig. 7, after which the box is tilted, as shown in full lines in Fig. 7, so as to dump into the cart or van. Then it assumes of itself, or is turned back again to its vertical position, and when the pawl and ratchet are used, the pawl 1 is released from the ratchet wheel 2, and the box is lowered into its place again. This can also be accomplished in other ways, as in Figs. 10 and 11, in which the racks 9 and 10 are fixed upon each side of the frame $c$. Two pinions 12 gear one into each of these racks. These pinions are keyed onto the spindles 13, 13, which revolve in journals fixed to the case $a$. At one end of each of these spindles worm wheels 14 are secured, while above or below at right angles to them, and gearing into them, two worms 15, are securely keyed onto the shaft 5, which is extended beyond the case and provided with a crank 17 at one or both ends. Upon turning the crank the pinions 12 are revolved through the action of the worms and worm-wheels, which in turn raise the racks 9 and 10, and the box $b$ in a manner similar to that already described. Instead of tilting the box in the manner hereinbefore described one end of a chain 18 may be fastened to a suitable point 19, of the box $b$, and the other end fastened to any convenient point 20 inside the case $a$ as indicated in Fig. 16. If this chain be adjusted to a suitable length, then as the frame $c$ is raised, the chain 18 will first be drawn tight and then automatically tilt the box on its pivots $d$, and bring it into the necessary position for dumping.

The cover $r$, is preferably made with side guide pieces r' which when the cover is on lie downward and inside of the box, and when the box is tilted for dumping, this cover with its sides projecting upward, constitutes a chute or trough to guide the garbage into the cart or van, the cover or its outer end then resting on the cart or being held or supported in any convenient way during the dumping.

Any of the covers for any of the cans described in this specification may have any known form of self-closing spring-catch or latch.

The box may be advantageously arranged in a brick pit as its casing built beneath the sidewalk 6, so that its top is level or substantially level with the ground or with the casing, as shown in Figs. 12, 13 and 15.

The box or garbage receptacle may be a plain iron receptacle 21 (see Fig. 14) protected by a removable cover 23, and an additional cover 24 may be attached by any suitable hinge to the curb or sidewalk automatically to close by gravity or otherwise a hole made in the side walk to receive the box. The boxes can be severally inserted in a brick pit, vault or well 22 built under the sidewalk as shown in Figs. 13 and 15.

Means such as a windlass and chain, racks and pinions or the like either as above described, or placed on the cart or vehicle may be used for raising the frame or standards carrying the receptacle to such a height from below the pavement that the receptacle can be moved upon its trunnions or points of suspension to discharge its contents into a cart or other vehicle by which the rubbish can be removed, or the cans can be removed by having bails or handles 25, thereon and adapted to be slid down below the pavement, and fresh or clean cans or boxes lowered into the pit, vault or casing. The full closed cans can be raised by means of a chain 26 and pulley attached to the cart or vehicle.

From the foregoing it will be seen that the means employed for raising the garbage box or cans from the sidewalk may be of either of the kinds above described, but PERCIVAL EVERITT preferred in many cases to attach the lifting crane to the cart or wagon, to raise the filled and covered boxes and carry them away to dispose of their contents.

What I claim as the invention of PERCIVAL EVERITT, deceased, is—

1. A garbage apparatus having in combination, an outer case, a garbage box having a permanently closed bottom and normally located within such case, devices substantially as described also within the case and serving to raise and lower the box, and a rod or its described equivalent within the case connected to the box, and controlled in its ascent by a bracket within the case, to automatically tilt the box.

2. In combination with an outer case, a pivoted garbage box normally within such case, devices substantially as described within the case serving to lift and lower the box, a rod or cord connected to said case and to said box, a bracket or lug on the inside of the case, and an adjustable stop or detent within the case to arrest the direct ascent of the box and to turn the same on its pivots to dump its contents, all substantially as set forth.

3. A garbage apparatus having in combination, an outer case constructed to be sunk partly or wholly in and supported by a sidewalk, a pivoted garbage box normally within such case and having a sliding frame fixed to and beneath the box, and devices within such case serving by means of a crank handle outside the case, to lift the frame and its attached box, then automatically to tilt the box and dump its contents, to return the box to its normal vertical position, and to lower it to its place in the case, all substantially as set forth.

4. In a garbage apparatus, the combination with a skeleton frame adapted to be raised and lowered, of a dumping box pivoted thereon, devices for lifting, lowering, and automatically tilting the same, and a cover on the said box thrown open by such automatic tilting, and serving also as a chute or guide to direct the garbage into a van or car.

5. In combination with the box and its independent supporting skeleton guide-frame, a casing adapted to be inserted in the ground and provided with a well beneath the same communicating with the bottom of the box, and serving to receive the lower part of such frame and also serving as a foot for steadying the casing.

6. In combination, the case, garbage box within the same, the independent skeleton frame adapted to be raised and lowered, the described devices for tilting the raised box, chains connected to the frame and to a drum, and gears on the drum shaft and on a crank shaft, all substantially as and for the purposes set forth.

7. In combination, the case, pivoted garbage box, the described lifting frame and restraining bar or chain for automatically tilting the same, chains i, and the crank, gears, drum, and ratchet wheel and its pawl, substantially as and for the purposes set forth.

8. In combination with the automatic tilting box or receptacle, the supporting frame and with means for raising and lowering the same, the forked piece pivoted to the supporting frame, and the piece or pin on the side of the box, adapted to engage with said forked piece, as and for the purposes set forth.

9. In combination with the casing the independent skeleton frame within the same and its normally closed receptacle, and with a windlass and gears for lifting the skeleton frame which supports the receptacle, a well secured to the bottom of the casing to receive the lower part of this frame when the apparatus is in its normal or lowered position, the well serving also as a foot for steadying the casing.

10. In combination with the casing fixed partially or wholly below the surface of the ground, and with a tilting garbage box or receptacle within the same, and with mechanisms substantially as described for lifting and lowering and tilting the box, vertical grooves in the side walls of the casing, and a rising and falling independent box-supporting frame guided by and adapted to slide in said grooves.

HENRY M. WOOLF,
*Ancillary executor of the estate of Percival Everitt, deceased.*

In presence of—
   JOSEPH N. TUTTLE,
   THADDEUS D. KENNESTON.